United States Patent [19]
Hosier et al.

[11] Patent Number: 5,633,679
[45] Date of Patent: May 27, 1997

[54] PHOTOSENSITIVE CHIP HAVING TRANSFER CIRCUITS WHICH COMPENSATE FOR SHIELDED TEST PHOTOSENSORS

[75] Inventors: Paul A. Hosier, Rochester; Jagdish C. Tandon, Fairport, both of N.Y.

[73] Assignee: Xerox Corporation, Stamford, Conn.

[21] Appl. No.: 444,629

[22] Filed: May 19, 1995

[51] Int. Cl.$^6$ .................................................. H04N 5/335
[52] U.S. Cl. ........................... 348/243; 348/294; 257/435
[58] Field of Search .................................. 348/294, 302, 348/303, 311, 313, 314, 243, 245; 250/208.1; 257/435; H04N 5/335

[56] References Cited

U.S. PATENT DOCUMENTS 5,081,536 1/1992 Tandon et al. ...................... 358/213.31
5,159,186 10/1992 Ohzu ...................................... 348/245

*Primary Examiner*—David E. Harvey
*Attorney, Agent, or Firm*—R. Hutter

[57] ABSTRACT

A photosensitive device includes a plurality of active photosensors, for receiving light from an original image, and at least one dark photosensor. The dark photosensor is shielded with a light shield so that it receives no light, and is used to establish a dark offset for the device. Each active photosensor and the dark photosensor have associated therewith an individual transfer circuit, including a reset node having a capacitance associated therewith. The capacitance of the reset node for the dark photosensor is selected to compensate for the extra capacitance created by the light shield.

7 Claims, 2 Drawing Sheets ial transfer circuit.

PHOTOSENSITIVE CHIP HAVING TRANSFER CIRCUITS WHICH COMPENSATE FOR SHIELDED TEST PHOTOSENSORS

INCORPORATION BY REFERENCE

The present application incorporates by reference U.S. Pat. No. 5,081,536, assigned to the assignee hereof.

FIELD OF THE INVENTION

The present invention relates to image sensor arrays used in raster input scanners. In particular, the invention relates to photosensitive chips wherein each photosensor has its own individual transfer circuit.

BACKGROUND OF THE INVENTION

Image sensor arrays typically comprise a linear array of photosensors which raster scan an image bearing document and convert the microscopic image areas viewed by each photosensor to image signal charges. Following an integration period, the image signal charges are amplified and transferred as an analog video signal to a common output line or bus through successively actuated multiplexing transistors.

For high-performance image sensor arrays, a preferred design includes an array of photosensors of a width comparable to the width of a page being scanned, to permit one-to-one imaging generally without the use of reductive optics. In order to provide such a "full-width" array, however, relatively large silicon structures must be used to define the large number of photosensors. A preferred technique to create such a large array is to make the array out of several butted silicon chips. In one proposed design, an array is made of 20 silicon chips, butted end-to-end, each chip having 248 active photosensors spaced at 400 photosensors per inch.

When the individual silicon chips are butted to form a single linear array of photosensors, several practical problems must be taken into consideration. One key problem stems from the fact that each individual chip in a full-width array in many ways acts as an independent circuit, the precise outputs of which may not be necessarily consistent with the outputs of other chips forming an entire system. Specifically, no matter what particular multiplexing scheme is used to read out the various signals from each photosensor in each array, the analog video output will be dependent on the particular characteristics of each individual chip. Some chips may be of a consistently higher voltage in their outputs than others. When the signals from a plurality of chips are collected and recombined to form an image, the areas of the image which were read by particular chips, or at positions corresponding to chip boundaries, may be slightly darker or lighter than they should be because of this chip-to-chip nonuniformity.

DESCRIPTION OF THE PRIOR ART

Many preferred designs of individual chips in full-width scanning arrays include "dark" photosensors, which are used to periodically reset the offset voltage for the photosensors. These dark photosensors are of the same semiconductor structure as the other "active" photosensors on each chip, but the dark photosensors are not exposed to light; one proposed design provides for dark photosensors which are physically identical to the active photosensors on the chip, with the exception that the dark photosensors are covered with an opaque aluminum light shield. Typically, in the scanning process, with each cycle of readout of photosensors on each chip, the readout of the first photosensor is preceded by readouts of one or more dark photosensors, which are used to reset the voltage offset associated with the chip and thereby correct signal drift.

It is known in the art of photosensitive solid-state devices that parasitic capacitances of various circuit elements is a significant source of error and noise when outputting image signals. In particular, each photosensor on a solid-state device, in addition to functioning as a light-sensitive diode, functions as a partially-charged capacitor. The capacitance on a particular photosensor at any given time will vary significantly depending on the extent of partial charge resident on the diode at that particular time. Various proposals are known in the art to minimize and/or compensate for the parasitic capacitance associated with individual photosensors. In the case of solid-state photosensitive devices having "dark" photosensors, which are used to establish a reference offset voltage for the entire device, the presence of an opaque, usually aluminum, light-shield over the dark photosensor represents a significant source of unintended capacitance associated with the particular dark photosensor. The aluminum light-shield in effect acts as a capacitor plate, substantially increasing the capacitance of the dark photosensor, particularly in comparison with active photosensors on the diode. Because dark photosensors are preferably as physically similar to an active photosensor as possible, the additional parasitic capacitance caused by a light-shield can significantly interfere with the function of the dark photosensor on a photosensor chip.

SUMMARY OF THE INVENTION

According to the present invention, there is provided a photosensitive apparatus, comprising a channel for accepting video signals therethrough, a first photosensor, and a second photosensor. A first transfer circuit is operatively disposed between the first photosensor and the channel, including a first reset node having a first reset capacitance associated therewith. The first reset node stores a charge related to an output signal from the first photosensor. A light shield is disposed over the second photosensor, preventing the second photosensor from receiving light. A second transfer circuit is operatively disposed between the second photosensor and the channel, including a second reset node having a second reset capacitance associated therewith. The second reset node stores a charge related to an output signal from the second photosensor. The second reset capacitance is not equal to the first reset capacitance.

DETAILED DESCRIPTION OF THE INVENTION

Figure 1:
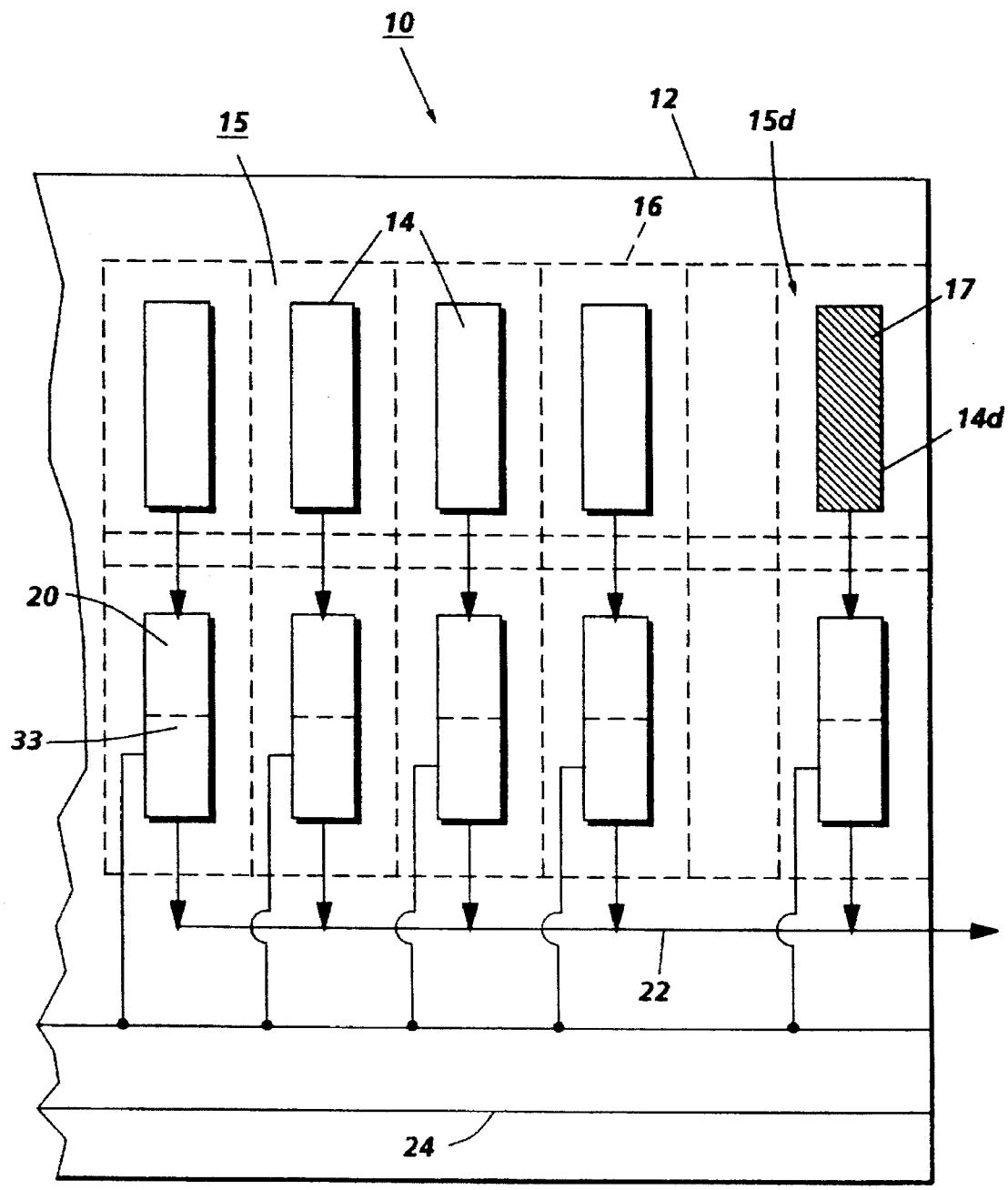
FIG. 1 is a plan view of an image scanning array having an array of photosite cells, each cell having a photodiode with two stage transfer circuit and amplifier for transferring image signal charges from the photodiodes to a common output bus and incorporating the "dark pixel" features of the present invention.

Referring to FIG. 1, there is shown a portion of an image sensor array with two stage transfer, designated generally by the numeral 10, of a design similar to that disclosed in the patent incorporated by reference. Image sensor array 10 includes a base or chip 12 of silicon with a plurality of photosites in the form of photodiodes 14 thereon. Photodiodes 14 are in closely spaced juxtaposition with one another on chip 12 in a linear array or row 16. Several smaller arrays such as array 10 can be abutted together to form a longer array, i.e. a full width or contact array. In such a full-width array, the spacing between adjacent photodiodes at the butted ends is the same as the spacing between the photodiodes within each chip, to maintain a consistent photodiode pitch across the entire array.

While photodiodes 14 are shown and described herein, other photosite types such as amorphous silicon or transparent electrode MOS type photosites may be envisioned. Further, while a one dimensional sensor array having a single row 16 of photodiodes 14 is shown and described herein, a two dimensional sensor array with plural rows of photodiodes may be contemplated.

Each photodiode 14 has a two stage transfer circuit 20 associated therewith which together with the photodiode and an amplifier 33 form a photosite cell 15 at the array front end. In each cell 15, the image signal charge from the photodiode is transferred by circuit 20 to amplifier 33 where the image signal charge from photodiode 14 is amplified to bring the image signal charge to a desired potential level prior to transferring the charge to a common video output line or bus 22. Suitable shift register and logic circuitry 24 provides timing control signals for connecting each pixel cell 15 to bus 22 in the proper timed sequence, as described in detail in the patent incorporated by reference.

Image sensor array 10 may for example be used to raster scan a document original, with the document original and the sensor array 10 moved relative to one another in a direction (i.e., the slow scan direction) that is normally perpendicular to the linear axis of array 10. At the same time, the array scans the document original line by line in the direction (i.e., the fast scan direction) parallel to the linear axis of the array. The image line being scanned is illuminated and focused onto the photodiodes 14. During an integration period, a charge is developed on each photodiode proportional to the reflectance of the image area viewed by each photodiode. The image signal charges are thereafter transferred by two stage transfer circuits 20 via amplifier 33 to output bus 22 in a predetermined step by step timed sequence.

As can be further seen in FIG. 1, there is disposed on array 10 an additional cell 15d, which is for the most part physically identical to the plurality of cells 15 forming the bulk of the photosensitive array. The only significant difference between cell 15d and the other cells 15 is that cell 15d is intended to function as a "dark photosensor" which will always output a response indicating that no light is affecting the photodiode thereof. The cell of the dark photosensor 15d outputs its signal through a two stage transfer and amplifier array and onto the video output line 22, exactly in the manner of the active photosensors in cells 15. The dark photosensor cell 15d, however, includes a light shield, indicated as 17, disposed completely over the photodiode 14d thereof. Light shield 17 is a layer of opaque aluminum which simply prevents any light from reaching the photodiode 14d. Photodiode 14d will always output a signal consistent with no light thereon, and thus the dark photosensor cell 15d can be used to establish a reset voltage or offset signal by which all of the active photosensors in cells 15 can be calibrated. The output of the dark photosensor in cell 15d is typically measured with every readout of the entire linear array 10, and the dark signal therefrom can enable periodic recalibration of the whole chip, for establishing a consistent output for all of the cells 15.

(As shown in FIG. 1, the dark photosensor in cell 15d is disposed in the same linear array as the active cells 15, which receive light from an original image. This configuration of dark photosensor 14d is shown only to emphasize the general similarity of the dark photosensor in cell 15d compared to the active photosensors in cells 15. However, it is preferred, particularly in a design of a chip which is intended to be abutted to other chips to form a single long array, to dispose the cell 15d for the dark photosensor 14d elsewhere on the chip, and not as part of the same linear array with the active cells 15.)

Figure 2:
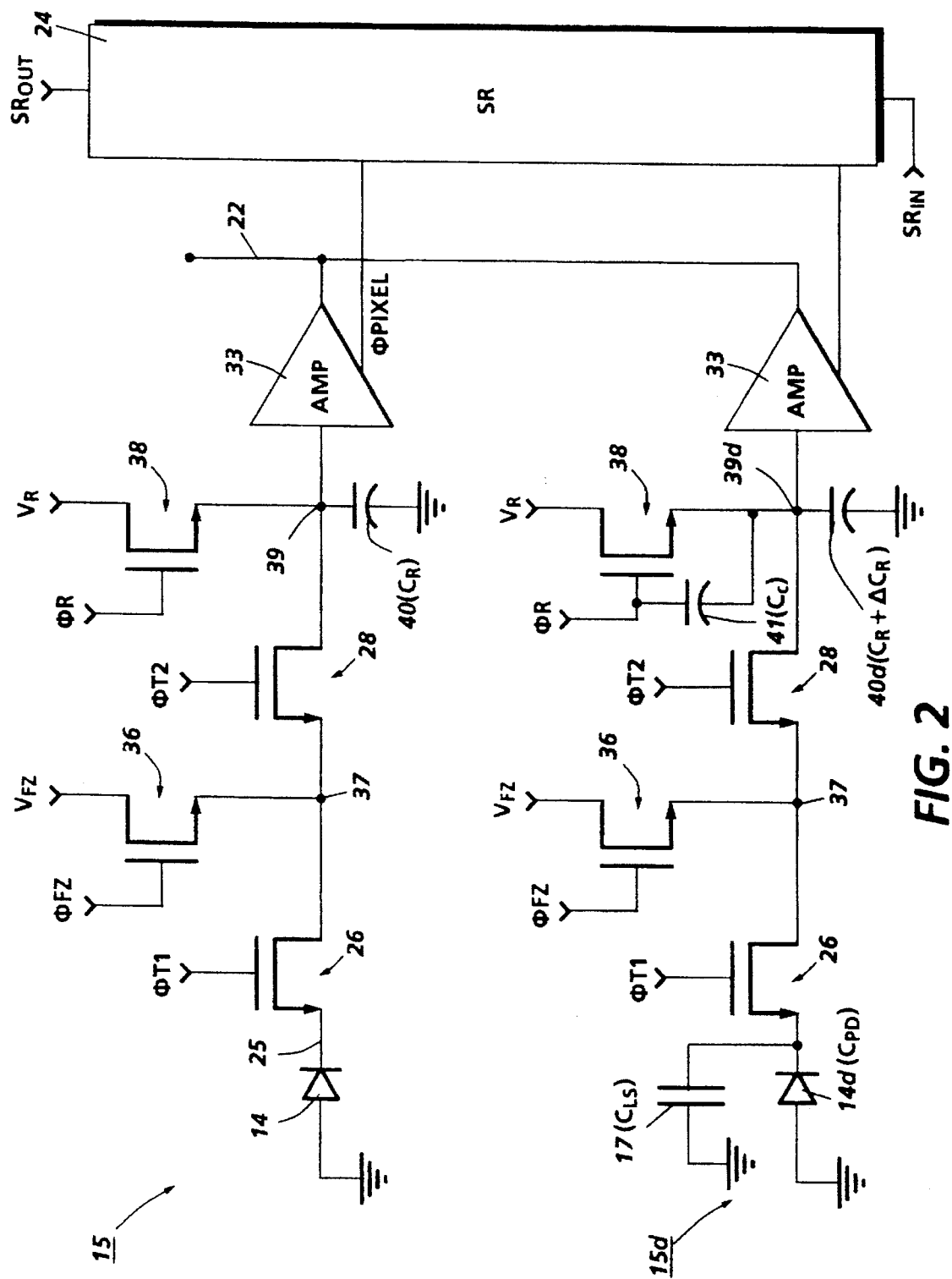
FIG. 2 is a schematic diagram of two representative photosite cells, one active and one "dark," showing the compensating capacitor system of the present invention.

FIG. 2 is a schematic diagram showing the transfer circuits of two representative cells 15 of the linear array, an active cell indicated as 15 and a dark photosensor cell indicated as 15d. As is apparent from FIG. 1, there is on a particular array 10 a relatively large number of active photosensors 15, and a relatively small number of dark cells 15d. In one typical configuration, a solid-state photosensitive device includes 248 active photosensors in cells 15 and four dark photosensor cells 15d. The preferred configuration and operation of the two-stage transfer circuits shown in FIG. 2 are described briefly below, but a more detailed description of the configuration and operation of the two-stage transfer array is given in the patent incorporated by reference.

The two stage transfer circuit 20 associated with each cell 15 has first and second stage transfer transistors 26, 28 for transferring the image signal charge from the photodiode 14 to amplifier 33. Transistors 26, 28 are in series with line 25 connecting one electrode of photodiode 14 with the input gate of amplifier 33. The other electrode of photodiode 14 is grounded.

A bias charge injection transistor 36 is provided to inject a bias charge, for example, an electrical fat zero $V_{FZ}$, to line 25 at middle node 37. Positioning transistor 36 between transistors 26, 28 and selecting the proper clock voltage levels allows transistor 26 to determine the surface potential during both the bias charge injection and charge transfer phases. As a result, the amount of bias charge injected is not dependent on the thresholds of transistors 36 and 26. This eliminates non-uniformities caused by transistor threshold variations from cell to cell while maintaining the high transfer efficiency provided by two stage transfer. A reset transistor 38 controls the reset voltage $V_R$ at the node 39 between transistor 28 and amplifier 33.

A suitable clock source (not shown) provides pulses $\phi_R$, $\phi_{t1}$, $\phi_{t2}$, $\phi_{FZ}$, and $V_{FZ}$. Pulses $\phi_{t1}$, $\phi_{FZ}$, and $V_{FZ}$ provide for injection of the bias charge into line 25, and pulses $\phi_{t2}$ and $\phi_R$ for injection of the reset voltage $V_R$ to line 25 at node 39. As described in detail in the patent incorporated by reference, pulses $\phi_{t1}$ and $\phi_{t2}$ of different amplitude are provided for transferring the image signal charges from photodiodes 14 to amplifiers 33. The $\phi_{PIXEL}$ signals for multiplexing the amplified charge output by amplifier 33 onto the common video output bus 22 are provided by shift register and logic circuitry 24.

In one embodiment of the invention, an aluminum light shield 17 is disposed over the main surface of dark photodiode 14d. Electronically, it can be seen that the aluminum light shield 17 has the effect of a capacitor connected in parallel with the photosite 14d. As mentioned above, the general function of the two-stage transfer array, either in an active cell 15 or the dark photosensor cell 15d, is to transfer a charge from the photodiode 14 to the reset node 39. The charge, which represents a light signal from one pixel of the original image, in effect waits at reset node 39d, right before the amplifier 33, until shift register 24 sends a signal to amplifier 33 to cause the charge on reset node 39 to pass through amplifier 33, resulting in a voltage signal on video line 22. However, the light-shield capacitance, as indicated as $C_{LS}$ on light shield 17, represents a source of noise affecting the magnitude of the charge retained at reset node 39d in the case of a dark cell 15d.

It is a property of CMOS circuits that such reset nodes as 39 or 39d have associated therewith parasitic capacitances which enable charge to be temporarily retained at a particular node. As indicated in FIG. 2, the capacitance associated with the reset node 39, given as $C_R$, may exist either purely parasitically or may include a discrete capacitor such as indicated by 40. As shown in the cell 15, this reset node capacitance $C_R$ (here shown as a discrete capacitor 40) exists between reset node 39 and ground. Generally, the same capacitance $C_R$ (capacitor 40d) will exist between reset node 39d and ground for cell 15d. However, according to the present invention, it is the intention to modify the basic capacitance $C_R$ from reset node 39d so that it compensates for the additional light-shield capacitance $C_{LS}$ created by light shield 17.

For the two-stage transfer circuits in each cell 15, the photodiode 14 will have associated therewith an inherent parasitic capacitance here indicated as $C_{PD}$ (for "photodiode" capacitance). Capacitance $C_{PD}$ is an inevitable property of every photodiode 14, including the photodiode 14d forming the dark photosensor. However, for dark cell 15d, the light-shield capacitance $C_{LS}$ forms an additional capacitance in parallel with the capacitance $C_{PD}$ of photosensor 14d.

According to the present invention, the basic capacitance $C_R$ associated with reset node 39 and indicated by capacitor 40 can be modified in order to compensate for the additional $C_{LS}$ associated with the $C_{PD}$ of photosite 14d. The capacitor 40d associated with reset node 39d in dark photosensor cell 15d is designed to include an additional predetermined $\Delta C_R$ which serves as a compensating capacitance. Thus, while capacitor 40 in an active pixel cell 15 has a standard reset node capacitance $C_R$, the reset node capacitance 40d in the dark cell 15d includes a compensating additional capacitance, so that the actual total capacitance of capacitor 40d in dark cell 15d is $C_R + \Delta C_R$, as shown.

In order to calculate the desired additional capacitance $\Delta C_R$ to compensate for the effect of light-shield capacitance $C_{LS}$, so that the outputs of active cells 15 and dark photosensor cells 15d are identical, the additional reset capacitance $\Delta C_R$ must satisfy the equation:

$$\frac{C_{PD} + C_{LS}}{C_R + \Delta C_R} = \frac{C_{PD}}{C_R}$$

Calculating for the total capacitance of capacitor 40d, which represents the basic capacitance $C_R$ plus the additional compensating $\Delta C_R$:

$$C_R + \Delta C_R = \frac{C_R(C_{PD} + C_{LS})}{C_{PD}}$$

with the values of $C_R$, $C_{PD}$, and $C_{LS}$ being determined empirically for a particular chip design. Thus, the dark photosensor cell 15d includes a predetermined reset node capacitance 40d, which compensates for the additional light-shield capacitance $C_{LS}$ caused by the presence of light shield 17 for the dark photodiode 14d.

The issue of compensating for light-shield capacitance $C_{LS}$ is particularly acute in active video photosensitive devices, such as shown in FIG. 2, as opposed to photosensitive charge-coupled devices (CCDs). With CCDs, individual charge packets representative of light intensities on a set of photosensors are individually passed through a single amplifier in order to yield a sequence of video voltage signals. Because all of the charge packets in a CCD pass through a single amplifier, any distortions or noise sources associated with the system will effect each charge packet equally, and thus there is no great necessity for constantly recalibrating a reset voltage for a large set of photosensors. In contrast, the solid-state device shown in FIG. 2 shows a plurality of individual amplifiers sending video signals onto video line 22. The signal voltage from each amplifier not only contains a voltage proportional to light, but also an offset voltage proportional to the fat-zero charge transferred from the photodiode. Since this fat-zero charge is altered by the light shield capacitance, $C_{LS}$, it must be compensated for, to get this same voltage level out of both dark pixel amplifiers and active pixel amplifiers.

The offset of the video signal may drift over time, for example, because of changes in temperature affecting the entire array 10. In full-page-width systems in which a plurality of essentially independent arrays 10, such as disposed on individual separate chips, are provided, an offset of the video signal is maintained consistently through a large number of chips. This uniformity of DC level of the offset is provided by the dark photosensor cells 15d on each individual small chip, which, as mentioned above, repeatedly perform an "experiment" of determining the offset for a pixel for which it is known no light is reaching the photosensor; the derived offset can then be used in processing actual signals from the active photosite cells 15. This dark pixel technique for constantly resetting the offset is further enhanced by the compensatory capacitance associated with the reset node for the dark photosensor, according to the present invention.

Also shown in FIG. 2 is a "transistor capacitance" $C_c$, represented by a capacitor 41, coupled between the reset transistor 38 and reset node 39d for the dark photosensor cell 15d. After each reset pulse to reset transistor 38 in a readout cycle, a certain amount of voltage is coupled onto $C_R$ by $C_c$. In a practical embodiment of the present invention, the coupling through this capacitance $C_c$ (which exists in both active and dark cells) is also affected by the $\Delta C_R$ to compensate for the light shield capacitance $C_{LS}$. It has been found that, when the $C_c$ coupling is taken into account, the value of $\Delta C_R$ need be only half of its value calculated in the above equations.

While the invention has been described with reference to the structure disclosed, it is not confined to the details set forth, but is intended to cover such modifications or changes as may come within the scope of the following claims.

We claim:

1. A photosensitive apparatus, comprising:
   a channel for accepting video signals therethrough;
   a first photosensor;
   a first transfer circuit operatively disposed between the first photosensor and the channel, including a first reset node having a first reset capacitance associated therewith, the first reset node being adapted to store a charge related to an output signal from the first photosensor;
   a second photosensor;

a light shield disposed over the second photosensor, preventing the second photosensor from receiving light;

a second transfer circuit operatively disposed between the second photosensor and the channel, including a second reset node having a second reset capacitance associated therewith, the second reset node being adapted to store a charge related to an output signal from the second photosensor, the second reset capacitance being not equal to the first reset capacitance.

2. The apparatus of claim 1, the second reset capacitance being preselected to compensate within the second transfer circuit for a light-shield capacitance associated with the second photosensor.

3. The apparatus of claim 2, further comprising a reset transistor associated with the second reset node, a transistor capacitance being formed between the reset transistor and the second reset node, the second reset capacitance being preselected to compensate within the second transfer circuit for a light-shield capacitance associated with the second photosensor, taking into account the transistor capacitance.

4. The apparatus of claim 1, the first transfer circuit including means for applying a fat zero voltage to the first photosensor and the second transfer circuit including means for applying a fat zero voltage to the second photosensor.

5. The apparatus of claim 1, the first transfer circuit including an amplifier operatively disposed between the first reset node and the channel and the second transfer circuit including an amplifier operatively disposed between the second reset node and the channel.

6. A photosensitive apparatus, comprising:

a channel for accepting video signals therethrough;

a first photosensor;

a first transfer circuit operatively disposed between the first photosensor and the channel, the first transfer circuit including means for applying a fat zero voltage to the first photosensor and a first reset node having a first reset capacitance associated therewith, the first reset node being adapted to store a charge related to an output signal from the first photosensor;

a second photosensor;

a light shield disposed over the second photosensor, preventing the second photosensor from receiving light;

a second transfer circuit operatively disposed between the second photosensor and the channel, including means for applying a fat zero voltage to the second photosensor and a second reset node having a second reset capacitance associated therewith, the second reset node being adapted to store a charge related to an output signal from the second photosensor, the second reset capacitance being preselected to compensate within the second transfer circuit for a light-shield capacitance associated with the second photosensor.

7. The apparatus of claim 6, further comprising a reset transistor associated with the second reset node, a transistor capacitance being formed between the reset transistor and the second reset node, the second reset capacitance being preselected to compensate within the second transfer circuit for a light-shield capacitance associated with the second photosensor, taking into account the transistor capacitance.

* * * * *